March 9, 1965 — J. M. EITEL — 3,172,642
CABLE GUIDE
Filed Jan. 15, 1962
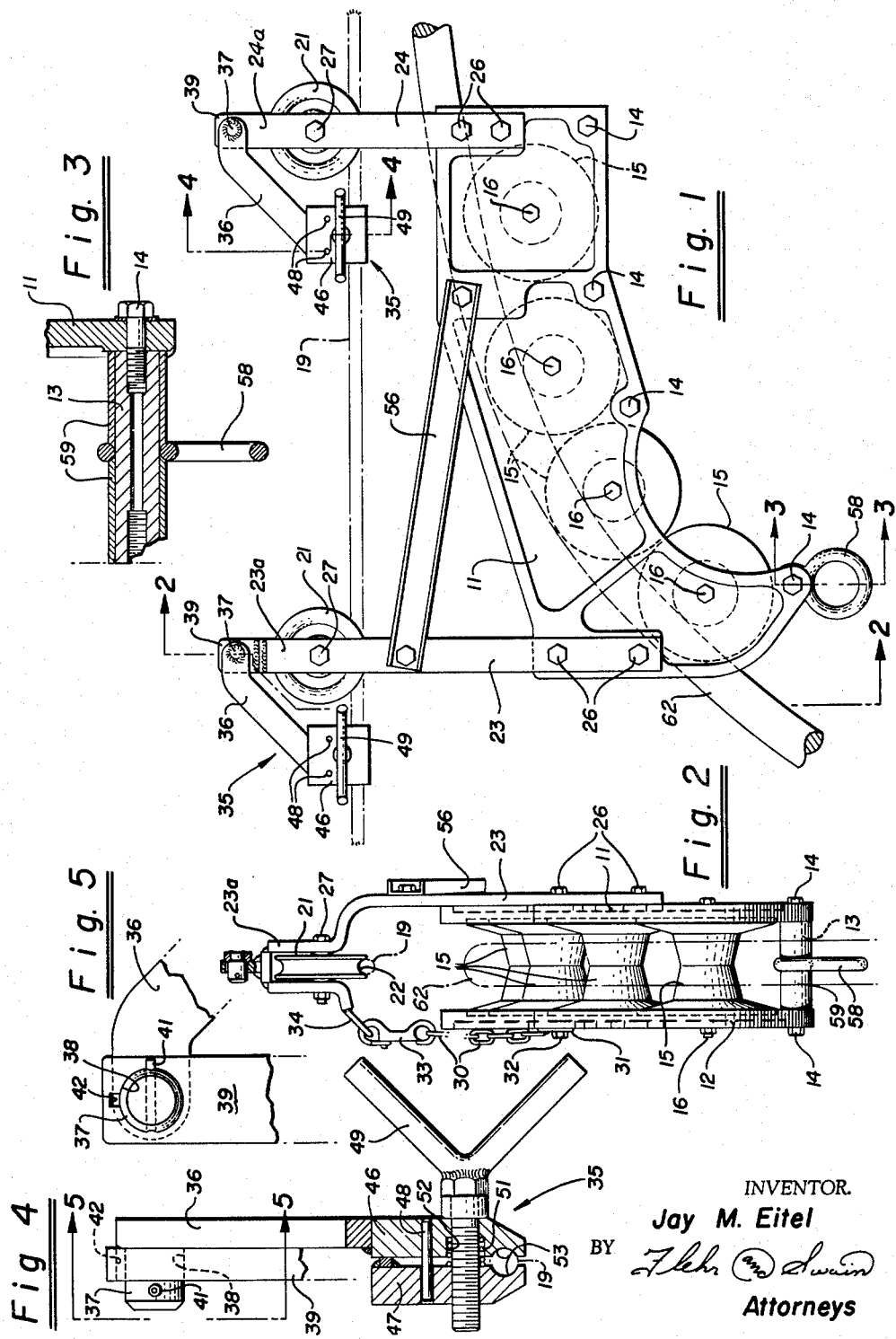
INVENTOR.
Jay M. Eitel
BY
Attorneys

United States Patent Office 3,172,642
Patented Mar. 9, 1965

3,172,642
CABLE GUIDE
Jay M. Eitel, Los Altos, Calif., assignor to Telsta Corp., San Carlos, Calif., a corporation of California
Filed Jan. 15, 1962, Ser. No. 166,304
3 Claims. (Cl. 254—134.3)

This invention relates to a cable guide and more particularly to a cable guide for use in guiding cable from a cable reel into proximity with messenger or strand so that the cable lies in a plane which is substantially parallel to the messenger or strand.

In the placement of cable and similar elongate members, there is a need for a cable guide for guiding the cable as it passes off of the cable drum or reel and for placing it in a position which is substantially parallel to the messenger or cable upon which the cable guide is mounted or travels. Cable guides heretofore provided have not been completely satisfactory because they create undue friction which tends to retard the movement of the cable. This has been primarily due to the fact that troughs or shoes have been utilized for guiding the cable which have a high coefficient of friction. Also, in the past, it has been difficult to secure such cable guides to the messenger so that the cable guide will be stationary. There is, therefore, a need for a new and improved cable guide.

In general, it is an object of the present invention to provide a cable guide which overcomes the above named disadvantages and which particularly reduces friction to a minimum.

Another object of the invention is to provide a cable guide of the above character which is relatively light in weight and can be readily placed upon the messenger or strand upon which the cable guide is to travel or to be affixed or secured.

Another object of the invention is to provide a cable guide of the above character which can be readily used in a stationary position with the cable being pulled through it or travelling on the messenger and guiding the cable as the cable passes through the cable guide.

Another object of the invention is to provide a cable guide of the above character which can be utilized for roadside and fieldside cable installations.

Additional objects and features of the invention will appear from the following description in which the preferred embodiment is set forth in detail in conjunction with the accompanying drawings.

Referring to the drawings:

FIGURE 1 is a side elevational view of a cable guide incorporating my invention.

FIGURE 2 is a view looking along the line 2—2 of FIGURE 1.

FIGURE 3 is an enlarged cross-sectional view taken along the line 3—3 of FIGURE 1.

FIGURE 4 is an enlarged cross-sectional view taken along the line 4—4 of FIGURE 1.

FIGURE 5 is a cross-sectional view taken along the line 5—5 of FIGURE 4.

In general, my cable guide is used for guiding cable from a cable drum or reel into proximity with a messenger or strand. It consists of a pair of spaced parallel side frame members between which are rotatably mounted a plurality of rollers which define a path of travel for the cable in the cable guide. A pair of pulleys are mounted on the frame members on opposite ends thereof and generally overlie the rollers. The pulleys are adapted to be mounted on the messenger or strand so that they will support the rollers in a position generally underlying the strand. Removable clamping means is also mounted on the side frame members and is adapted to clamp the cable guide to the messenger so that the cable guide will be held stationary as the cable is pulled through it.

As shown in the drawings, my cable guide consists of a pair of spaced parallel side frame members 11 and 12 which are preferably formed of a relatively light material such as cast aluminum. The spacing between the side frame members 11 and 12 is maintained by spacers 13 into which cap screws 14 have been threaded as shown particularly in FIGURE 3. The side frame members 11 and 12 have a particular configuration as shown in FIGURE 1 of the drawings. A plurality of rollers 15 are rotatably mounted between the side frame members 11 and 12 and are supported therein by bolts 16. Bushings (not shown) may be provided on the bolts 16 to ensure ease of rotation of the rollers 15. The side margins of the rollers 15 are recessed in the side frame members 11 and 12, as shown in FIGURE 2, to prevent multi-conductor wire cables from snagging in between the rollers 15 and the side frame members 11 and 12. Also, the front edges of the frame members 11 and 12 are radiused so that the frame members can serve as guide means without damaging the cable.

The rollers 15 are arranged in a predetermined manner and, as shown, are arranged to provide an arcuate path as the cable travels over the upper surfaces of the pulleys or rollers 15 so that the cable is shifted gradually from an angular position to a position which is substantially horizontal and parallel to the messenger 19 upon which the cable guide is adapted to be mounted as hereinafter described.

Means is provided for supporting the frame members 11 and 12 and the rollers 15 carried thereby upon the messenger or strand and consists of a pair of pulleys 21 mounted on opposite ends of the frame members with their axes of rotation parallel to the axis of rotation of the rollers 15. The grooves 22 provided in the pulleys 21 are in line with the centers of the rollers 15, as shown in FIGURE 2, so that the rollers 15 will immediately underlie the messenger 19 on which the pulleys 21 travel.

The pulleys 21 are carried by a pair of arms 23 and 24 affixed to the front and rear, respectively, of the side frame member 11 as shown in the drawings by suitable means such as cap screws 26. The arms 23 and 24 are provided with U-shaped upper portions 23a and 24a, respectively, in which the pulley 21 is rotatably mounted upon a bolt 27.

Safety means is provided for retaining the cable guide on the messenger so that it cannot jump off of the messenger and consists of a safety chain 30 which has one end affixed to a plate 31 which is secured to the side frame member 12 by a cap screw 32. A snap 33 of conventional construction is provided on the other end of the chain and is adapted to engage a fixed ring 34 secured to the U-shaped portion 23a. A similar chain (not shown) is also provided on the rear of the cable guide and is adapted to be secured to a ring (not shown) provided on the U-shaped portion 24a.

Means is provided for releasably securing the cable guide to the messenger in the form of a clamping assembly 35 removably secured to each of the arms 23 and 24. Each clamping assembly consists of an inclined arm 36 that is provided with a cylindrical member 37 on one end thereof. The cylindrical member 37 is rotatably mounted in a hole 38, an extension 39 being provided on the U-shaped portions 23a and 24a. A pin 41 extends diametrically into the outer end of the cylindrical member 37 and serves to retain the cylindrical portion within the hole 38 provided in the extension 39. The extension 39 is provided with a slot 42 opening into the hole 38 which, when the arm 36 is rotated, will permit removal of the clamping assembly from the cable guide by merely moving the pin 41 into registration with the slot 42 and then withdrawing the pin and the cylindrical member 37 laterally from the hole 38.

A clamping member 46 is affixed to the free end of the arm 36. A cooperative clamping member 47 is slidably mounted on a pair of laterally extending pins 48 provided in the clamping member 46. The clamping member 47 is threadedly engaged by a wing bolt 49 which is rotatably mounted in the clamping member 46. A spring 51 is mounted on the bolt 49 and is seated within a well 52 provided in the member 46. The spring 51 serves to yieldably urge apart the clamping members 46 and 47. Both of the clamping members 46 and 47 are provided with cooperating grooves 53 in which the messenger or strand is adapted to be seated and clamped between the members 46 and 47 by rotation of the wing bolt 49.

The arm 23 is provided with a brace 56 which has one end secured to the arm 23 and the other end secured to the frame member 11 as shown particularly in FIGURE 1 of the drawings. It will be noted that the frame members 11 and 12 are constructed in such a manner that the arms 23 and 24 can be mounted on either one of the frame members to facilitate fieldside or roadside placement of cable with the cable guide. Thus, when the arms 23 and 24 are shifted and mounted on the side member 12, the safety chains are also shifted and mounted on the other side member 11.

Means is provided to facilitate towing of the cable guide and consists of a ring 58 which is pivotally mounted upon one of the spacer bars 13 as shown particularly in FIGURE 3 of the drawings. As can be seen, the ring 58 is positioned equidistant between the side frame members 11 and 12 and is retained in that position by sleeves 59 mounted upon the spacer 13.

Operation and use of my cable guide may now be briefly described as follows. Assuming that the cable guide is to be used for roadside placement, the arms 23 and 24 are secured to the side frame member 11 as shown in FIGURE 1. The arms are normally positioned so they are on the outside of the strand away from the pole. This facilitates movement of the cable guide over clamps used for securing the messenger or strand to the poles as hereinafter explained. The snaps 33 are removed and the pulleys are positioned so that they rest upon the messenger 19 as shown in the drawings. If it is desired to pull the cable 62 through the cable guide, the clamping devices or assemblies 35 are secured in the extensions 37 and the wing bolts are operated to clamp the members 46 and 47 onto the messenger ahead of the pulleys 21 as shown particularly in FIGURE 1 of the drawings. These clamping devices serve to fix the position of the cable guide so that it will be retained in a predetermined position during the time the cable 62 is being pulled through the cable guide. The use of such clamping devices 35 is advantageous because it is possible to position the cable guide anywhere desired on the messenger 19. In particular, it is unnecessary to position the cable guide near a pole because the clamping devices 35 provide means for securing the cable guide in any position on the messenger or strand.

As soon as the cable guide has been positioned, the cable can be passed through the cable guide over the rollers 15 as shown in the dot and dash lines in FIGURE 1. The cable can be readily pulled through the cable guide because the rollers greatly facilitate movement of the cable and provide very little friction to the movement of the cable.

As soon as the cable has been pulled through the cable guide as far as desired and secured or dead ended, the cable guide can also be utilized for positioning the cable during movement of the cable guide. Thus, if it is desired that the cable guide travel while the cable is being positioned, the clamping devices 35 are removed by lifting them upwardly until the pins 41 register with the slots 42 to permit the lateral removal of the clamping devices. A rope or other tow line is then secured to the eye 58 and the cable guide can be pulled so that the rollers 21 travel on the messenger and urge the cable into a position which is substantially parallel to the messenger as the cable guide is pulled along the messenger. Again, the cable guide imparts very little friction to the movement of the cable because of the use of rollers 15 so that it can be readily pulled along. When a pole is reached, the cable guide can be readily lifted over the clamp securing the messenger to the pole by first lifting the forward roller 21 upwardly and sliding the cable guide ahead so that the forward roller clears the clamp. Thereafter, the rear roller 21 is lifted upwardly and the cable guide is again pushed forward so that the rear roller clears the clamp. The cable guide can then be pulled forward with the tow rope. The above positioning can be readily accomplished by hand by one man because it is only necessary to lift one end of the cable guide at a time and also because the rollers 15 minimize the friction as the cable guide is advanced.

As hereinbefore explained, the cable guide is readily adapted for either fieldside or roadside placement merely by shifting the arms 23 and 24 from one side frame member to the other side frame member. This always makes it possible to position the arms on the outboard side of the strand away from the pole. Also, as hereinbefore explained, the cable guide is readily adapted for either placement of cable while it is held stationary or placement of the cable while it travels along the messenger or strand.

As described in my copending application Serial No. 166,035, filed January 15, 1962, my cable guide is particularly adapted for use in the placement of second and third cables where already one or more cables has been lashed onto an existing messenger or strand.

It is apparent from the foregoing that I have provided a new and improved cable guide which is particularly advantageous. It is relatively light in weight so that it can be readily positioned and removed from the messenger or strand. The safety chains 38 prevent the cable guide from accidentally jumping off of the messenger or strand. The cable guide can be readily held in a fixed position by use of the removable clamping devices 35. It also can be readily used to travel on the messenger merely by pulling it. The construction of the cable guide is such that it can be readily and economically manufactured.

I claim:

1. In a cable guide for use in guiding cable from an inclined position into a position in proximity with the messenger or strand so that it is substantially parallel to the messenger or strand, a pair of spaced parallel unitary side frame members, a plurality of rollers rotatably mounted between the side frame members and defining a path for the travel of the cable between the side frame members, a pair of spaced removable upwardly extending arms mounted on one of the frame members, pulleys rotatably mounted on the arms and spaced above the rollers so that they are readily accessible from one side to facilitate placing the pulleys upon the strand or messenger for travel upon the messenger or strand, the pulleys serving to support the rollers so that the rollers generally underlie the messenger or strand and guide the cable upwardly so that it underlies the messenger or strand, and a removable clamping device pivotally secured to each of the arms, said removable clamping device including a pair of cooperative clamping members adapted to engage the messenger, means mounted between the clamping members for yieldably urging the clamping members apart, and means threaded into the clamping members for adjusting the positions of the clamping members with respect to each other against the force of the yieldable means.

2. In a cable guide for use for guiding cable into a position so that it is substantially parallel to a messenger or strand, a pair of spaced parallel unitary substantially planar side plates, a plurality of rollers, means carried by the side plates for rotatably mounting said rollers between the side plates so that the rollers define an arcuate path of travel for the cable, the rollers being positioned between the side plates so that substantial portions of the side plates extend above each of the rollers, the side plates being positioned immediately adjacent the rollers to prevent the cable from passing between the sides of the rollers and the side plates, a pair of arms, easily removable means for securing each of said arms to one of the side plates so that the arms are spaced apart and extend upwardly therefrom, a pulley mounted on each of said arms and spaced above and overlying the rollers so that there is a free space between the pulleys and the other side plate so that the cable guide can be readily placed over the strand or messenger with the pulleys riding upon the strand or messenger and with the rollers underlying the strand or messenger.

3. A cable guide as in claim 2 together with additional arms pivotally and removably mounted on at least one of said first named arms and clamping means mounted on each of said additional arms and adapted to grip the messenger or strand to secure the cable guide to the messenger or strand.

References Cited by the Examiner
UNITED STATES PATENTS

| | | | |
|---|---|---|---|
| 973,633 | 10/10 | Davis | 254—134.3 |
| 1,340,989 | 5/20 | Smith | 254—134.3 |
| 1,466,980 | 9/23 | Wilson | 254—192 |
| 1,812,961 | 7/31 | Kent | 254—134.3 |
| 1,865,113 | 6/32 | Kiesel | 254—134.3 |
| 1,905,761 | 4/33 | St. John et al. | |
| 2,360,237 | 10/44 | Kent. | |
| 2,668,688 | 2/54 | Stanford. | |

FOREIGN PATENTS

| | | |
|---|---|---|
| 127,812 | 5/48 | Australia. |
| 708,227 | 4/54 | Great Britain. |

OTHER REFERENCES

Electrical World Publication, pages 69–72, Apr. 24, 1948.

WILLIAM FELDMAN, *Primary Examiner*.

JOSEPH STRIZAK, MILTON MEHR, *Examiners*.